Dec. 9, 1924.

F. B. COOLEY 1,518,484

DISHWASHER

Filed Feb. 23, 1921    2 Sheets-Sheet 1

WITNESS: Paul N. Hunt

Frank B. Cooley
INVENTOR
BY Victor J. Evans
ATTORNEY

Dec. 9, 1924.

F. B. COOLEY

DISHWASHER

Filed Feb. 23, 1921

Frank B. Cooley
INVENTOR

Paul M. Hunt
WITNESS:

BY Victor J. Evans
ATTORNEY

Patented Dec. 9, 1924.

1,518,484

UNITED STATES PATENT OFFICE.

FRANK B. COOLEY, OF SPRINGFIELD, MISSOURI.

DISHWASHER.

Application filed February 23, 1921. Serial No. 447,128.

*To all whom it may concern:*

Be it known that I, FRANK B. COOLEY, a citizen of the United States, residing at Springfield, in the county of Greene and State of Missouri, have invented new and useful Improvements in Dishwashers, of which the following is a specification.

My present invention has reference to a dish washing machine.

My object is to produce a machine for this purpose which may be operated either manually or by a motor and which will thoroughly cleanse dishes in an expeditious manner without danger of breaking or otherwise injuring the same.

A further object is the production of a dish washing apparatus which shall be of a simple, cheap and efficient construction and which employs few replaceable parts.

A further object is the production, in a dish washing apparatus, of a dasher that acts on the water in a manner to elevate and splash the same against dishes which are arranged in suitable compartments provided therefor and also to force the water directly horizontally against the dishes, so that the same will be effectively cleaned in a quick and easy manner.

The foregoing, and other objects which will appear as the nature of the invention is better understood, may be accomplished by a construction, combination and operative arrangement of parts, such as is disclosed by the drawings which accompany and which form part of this specification.

In the drawings:

Figure 5 is a perspective view of the dasher.

Figure 1:
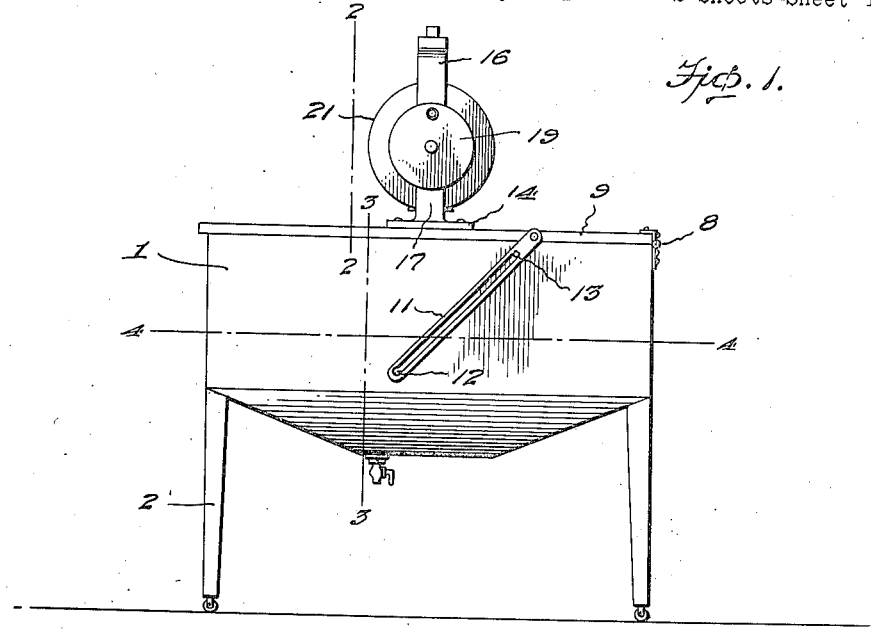
Figure 1 is an elevation of a dish washing apparatus constructed in accordance with this invention.
Figure 2:
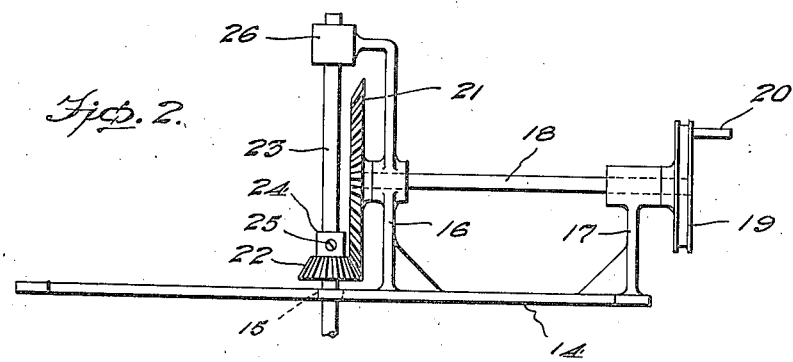
Figure 2 is a sectional view approximately on the line 2—2 of Figure 1.
Figure 3:
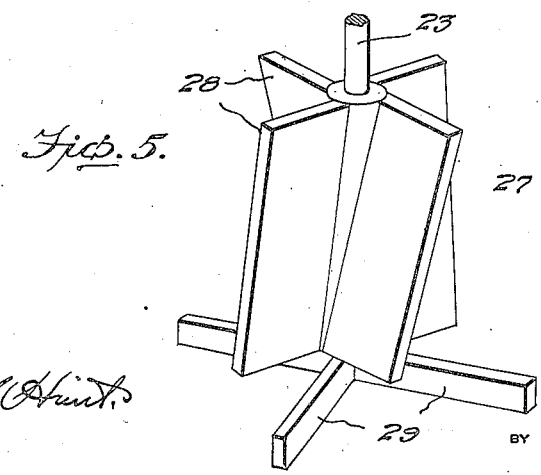
Figure 3 is a sectional view approximately on the line 3—3 of Figure 1.
Figure 3:
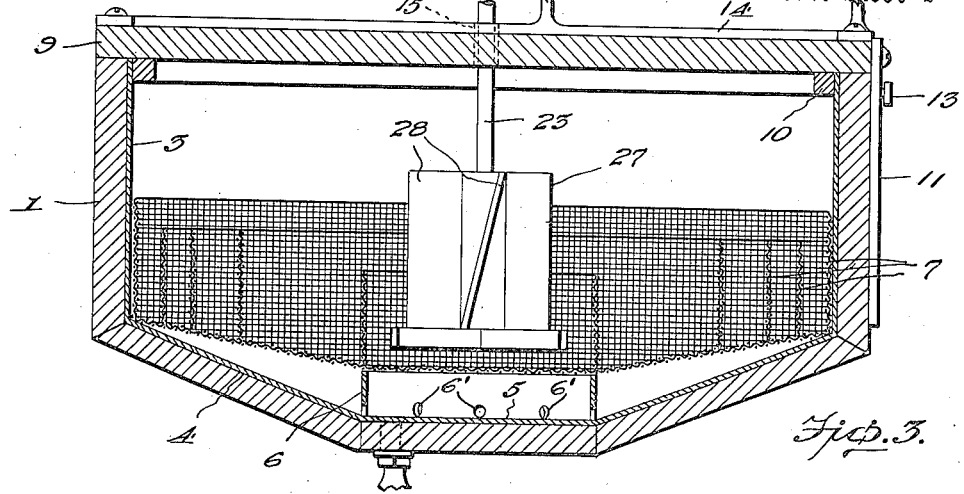
Figure 4:
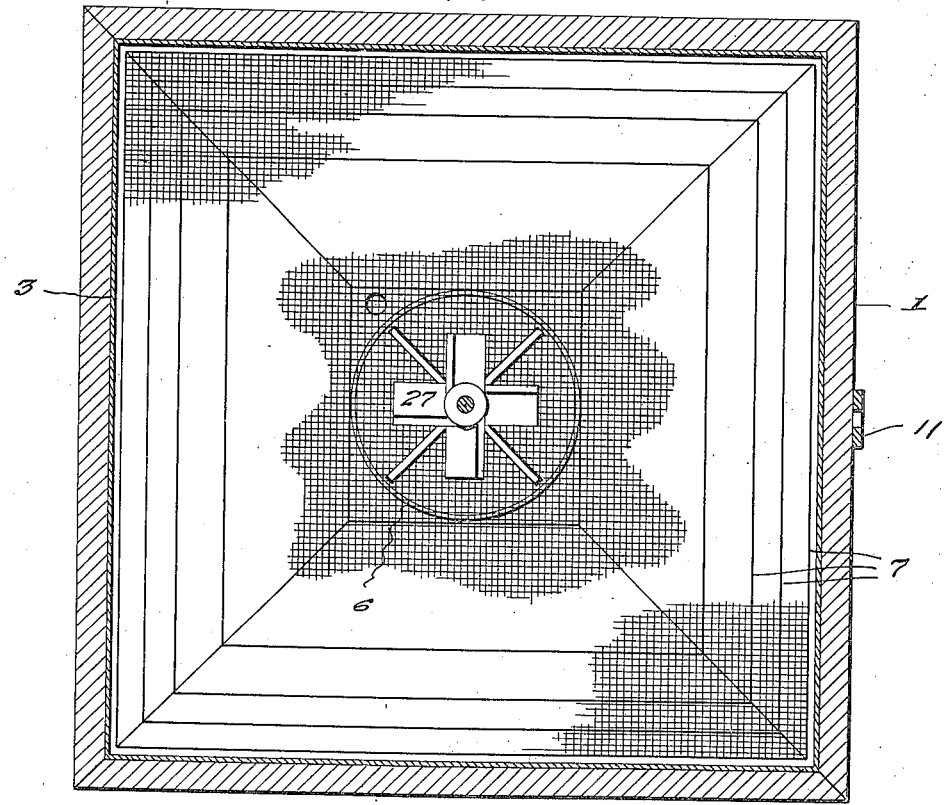
Figure 4 is a horizontal sectional view approximately on the line 4—4 of Figure 1.

As disclosed by the drawings, I employ a substantially rectangular receptacle 1 open at its upper end and supported at its corners by depending legs 2. On the legs are suitable casters whereby the device may be readily moved.

In the receptacle there is a metallic tank or water container 3 that has its bottom wall flared outwardly, as at 4 to the center thereof, the said center being flat, as at 5 and having a normally closed drain opening arranged adjacent one corner thereof and having secured thereon an upstanding annular shell 6 which is provided with a series of openings 6'. In the tank, and supported on the bottom wall of a reticulated basket 6' there is any desired number of annular vertical reticulated partitions 7 which provide therebetween compartments for the dishes to be cleaned. Preferably the bottom of the receptacle 1 is shaped to correspond with that of the tank, and the said bottom at the center thereof is open or may have an opening therethrough for the reception of the pipe that communicates with the drain opening in the tank. The water in the tank will be directed to the center thereof and will readily flow through the drain when the latter is opened.

On the open top of the receptacle there is hinged, as at 8, the cover member 9. The cover preferably has its inner face formed with an enlargement 10 disposed inward of its ends, and the sides and edges of the said enlargement, 10, contact with the inner walls of the tank 3, thus providing a water tight joint between the cover and tank. The cover, at the sides thereof is provided with pivoted braces 11 having their free ends notched, as at 12 to receive outstanding studs 13 on the sides of the receptacle, so that the cover may be arranged at substantially a vertical position with respect to the receptacle to permit of the dishes being arranged in the tank or removed therefrom.

On the outer face of the cover 9 there is centrally secured a plate 14. The plate has a central opening 15 therein which registers with a similar opening in the cover 9, and the said plate, at one side of the said opening 15 has an upstanding bracket member 16. The plate, at one of the ends thereof is provided with an additional upstanding bracket 17 of a less height than the bracket 16. The brackets 16 and 17 have hub portions that surround openings therein and these openings provide bearings for a shaft 18. The outer end of the shaft has secured thereon a wheel 19 provided with a handle 20. The wheel may be hitched to a suitable source of power, or the shaft may be rotated manually, if desired. The shaft 18, on the end thereof that projects inward of the bracket 16 has keyed thereto a beveled gear 21 which meshes with the pinion 22 on a vertically disposed shaft 23 that passes through the referred to opening 15 in the plate 14 and through the opening in the cover. The pinion has an outstanding hub 24 provided with a threaded opening through which passes a binding element 25 that locks the pinion on the shaft 23.

The bracket 16 has its upper end arranged at an angle and formed with an enlargement 26 that has an opening therethrough, and the vertical shaft 23 finds a bearing in this opening.

On the inner end of the shaft is the splasher that directs the water against the dishes for cleaning the same. The splasher is broadly indicated by the numeral 27 and has projecting from the hub thereof radially arranged angularly disposed blades 28. The slanting blades will force the water upwardly against the dishes to be washed. In addition to this, there are arranged on the base of the hub follower blades 29 that are extended from the hub centrally between the slanting blades and which will direct the water horizontally toward the dishes, and which also serve to churn the water when the splasher has its lower portion slightly arranged in the flange 6.

By providing the hub of the pinion with the binding element, the latter may be released to permit of the shaft 23 being moved upwardly so that the splasher will be arranged against the inner face of the cover, and the cover readily swung to open position without the splasher interfering with the dishes in the device.

Having thus described the invention, what I claim, is:

A dish washer of the character described comprising a lined receptacle having the central portion of its bottom flat, an annular shell rising from and having portions engaging the said flat portion of the bottom and being provided with spaced openings in the side walls to allow drainage to an outlet opening formed in the receptacle adjacent one corner of the flat portion thereof, a reticulated basket including partitions and having a central portion resting upon the shell and its outer edges engaging the receptacle at the line of juncture of the bottom and side walls thereof, and an agitating means disposed within the receptacle and having its lower portion arranged within the basket and above the top of the annular shell for the purpose specified.

In testimony whereof I affix my signaure.

FRANK B. COOLEY.